United States Patent Office 3,033,814
Patented May 8, 1962

3,033,814
POLY-α-OLEFINS CONTAINING A COMBINATION OF DIALKYL - 3,3' - THIODIPROPIONATES, ALKYLIDENEBISPHENOLS AND PHENYL SALICYLATES
Clarence E. Tholstrup, Kingsport, Tenn., assignor to Eastman Kodak Company, Rochester, N.Y., a corporation of New Jersey
No Drawing. Filed Jan. 25, 1960, Ser. No. 4,189
17 Claims. (Cl. 260—45.85)

This invention relates to new poly-α-olefin compositions. Preferred embodiments of the invention relate to polyethylene and polypropylene compositions having improved stability at elevated temperatures to oxidative degradation.

Poly-α-olefins such as polyethylene, polypropylene and the like are commonly subjected to elevated temperatures in the course of their processing into useful items of commerce. Such processing methods as rolling, injection molding, extrusion and the like at elevated temperatures usually result in oxidative degradation of the polymer. In addition, many uses of poly-α-olefins, such as in electrical insulation and the like, often times expose the poly-α-olefin to elevated temperatures. To minimize oxidative deterioration in poly-α-olefins, antioxidants or stabilizers are often times incorporated therein.

It is an object of this invention to provide new poly-α-olefin compositions having improved resistance to thermal degradation.

It is another object of this invention to provide new synergistic combinations of stabilizers for poly-α-olefin compositions.

It is also an object of this invention to provide novel polyethylene and polypropylene compositions containing synergistic combinations of compounds that improve the stability of the polyethylene and polypropylene compositions against deterioration resulting from exposure to elevated temperatures and ultraviolet light.

Other objects of the invention will be apparent from the description and claims that follow.

The present invention comprises poly-α-olefin compositions having incorporated therein a stabilzer combination of a diester of 3,3'-thiodiopropionic acid, an alkylidene-bisphenol and a phenyl salicylate.

The diesters of 3,3'-thiodipropionic acid comprising the present stabilizer combination have the following formula:

$$S(CH_2CH_2COR)_2$$

wherein R is an alkyl radical having at least 4 and generally 4 to 20 carbon atoms, with 8 to 18 carbon atoms being preferred. A particularly effective ester has twelve carbon atoms for the R substituent, namely, dilauryl 3,3'-thiodipropionate. However, any diester of 3,3'-thiodipropionic acid as described above can be employed in the present stabilizer combination including the butyl, amyl, hexyl, heptyl, octyl, monyl, decyl, tridecyl, myristyl, pentadecyl, cetyl, heptadecyl, stearyl, and eicosyl diesters of 3,3'-thiodipropionic acid, or mixtures thereof.

A wide variety of alkylidenebisphenols can be effectively utilized in the present stabilizer combinations, particularly those described in the copending application by Joyner, Shearer and Tholstrup Serial No. 850,985, filed November 5, 1959. A particularly effective group of alkylidenebisphenols have the following formula

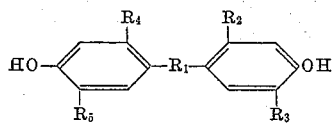

wherein $R_1$ is an alkylidene radical having 1 to 12 carbon atoms, and wherein $R_2$, $R_3$, $R_4$ and $R_5$ are hydrocarbon radicals having 1 to 12 carbon atoms including benzyl radicals, cyclohexyl radicals, 1-alkylbenzyl radicals, 1-alkylcyclohexyl radicals, or more usually alkyl radicals having 1 to 12 and preferably 1 to 4 carbon atoms. $R_3$ and $R_5$ are desirably tertiary alkyl radicals having 4 to 8 carbon atoms.

The phenyl salicylate component of the present stabilizer combinations likewise can be widely varied, and includes phenyl salicylates having the following formula

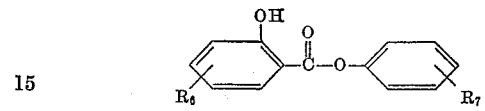

wherein $R_6$ and $R_7$ are hydrogen atoms or hydrocarbon radicals having 1 to 15 carbon atoms including benzyl radicals, cyclohexyl radicals, 1-alkylbenzyl radicals, 1-alkylcyclohexyl radicals, or more usually alkyl radicals having 1 to 15 carbon atoms. Suitable substituted phenyl salicylates that can be utilized include those described in the copending application by Addelburg, Lappin and Rouse, Serial No. 775,336, filed November 21, 1958.

The combination of the described diesters of 3,3'-thiodipropionic acid, alkylidenebisphenols and phenyl salicylates can be used to stabilize a wide variety of solid poly-α-olefin compositions against deterioration resulting from exposure to elevated temperatures. Any of the normally solid polymers of a α-monoolefinic aliphatic hydrocarbons containing 2 to 10 carbon atoms can be stabilized in accordance with the invention. The subject stabilizer combinations are preferably used in polyethylene and polypropylene, although such poly-α-olefins as poly(3-methylbutene-1), poly(4-methylpentene-1), poly(pentene-1), poly(3,3-dimethylbutene-1), poly(4,4-dimethylbutene-1), poly(octene-1), poly(decene-1) and the like can also be stabilized with the subject stabilizer combinations. Both the so-called "low density" and "high density" or high crystallinity poly-α-olefin compositions can be stabilized in accordance with the invention. Reference is made to Fawcett et al. U.S. Patent No. 2,153,553, granted April 11, 1939, and to copending applications Coover U.S. Serial No. 559,536, filed January 17, 1956, now abandoned, and Coover et al. U.S. Serial No. 724,904, filed March 31, 1958, now abandoned, with regard to the prepartion of various poly-α-olefin compositions that can be stabilized against thermal degradation in accordance with the invention. The additive stabilizer combinations of the invention are especially useful for stabilizing the solid resinous poly-α-olefins having average molecular weights of at least 15,000 and more usually at least 20,000, although the stabilizer combinations of the invention can also be utilized to stabilize the so-called poly-α-olefin waxes having lower average molecular weights of usually 3,000 to 12,000.

The amount of the combination of the diester of 3,3'-thiodipropionic acid, the alkylidenebisphenol and the phenyl salicylate employed in poly-α-olefin compositions in accordance with the invention can be widely varied, the stabilizing amount of this combination usually varying with the particular use to which the poly-α-olefin compositions are to be put. Concentrations of about .001% to 10% and generally about .001% to 5% for each component of the stabilizer combination are used, with about .01% to 3% being preferred, the concentration being based on the weight of the poly-α-olefin.

The stabilizer combinations of the invention can be incorporated or blended into poly-α-olefin compositions by the conventional methods utilized for blending such materials into resins or plastics. Typical of such methods that can be suitably employed include milling on heated rolls, deposition from solvents, and dry blending. The stabilizers of the invention can be incorporated separately or together into the poly-α-olefin compositions.

The stabilizer combinations of the present invention lend to poly-α-olefin compositions improved stability, and more particularly, improved stability against oxidative deterioration resulting from exposure to elevated temperatures. In addition, poly-α-olefin compositions containing the stabilizer combinations of the invention have enhanced stability against deterioration resulting from exposure to sunlight or ultraviolet light. Thus, poly-α-olefins stabilized in accordance with the invention have an extended life expectancy and can be used more effectively than unstabilized poly-α-olefins for a wide diversity of uses. Poly-α-olefins stabilized as described can be cast, extruded, rolled or molded into sheets, rods, tubes, pipes, filaments and other shaped articles, including the widely used films of the polymers about .5 to 100 mils in thickness. The present compositions can be used for coating paper, wire, metal foil, glass fiber fabrics, synthetic and natural textiles or fabrics, and other such materials.

While phenyl salicylates are effective additives in poly-α-olefins for minimizing deterioration resulting from exposure to ultraviolet light, such additives individually do not significantly improve poly-α-olefins with respect to resistance to deterioration resulting from exposure to elevated temperatures. Similarly, combinations of phenyl salicylates and dialkyl-3,3'-thiodipropionates do not significantly improve poly-α-olefins with respect to resistance to deterioration resulting from exposure to elevated temperature. Joyner, Shearer and Tholstrup, in copending application Serial No. 850,985, filed November 5, 1959, described poly-α-olefins having improved thermal stability containing synergistic combinations of alkylidenebisphenols and dialkyl-3,3'-thiodipropionates. I have now found that when phenyl salicylates are added to the combinations described by Joyner, Shearer and Tholstrup, an improved three-component synergistic stabilizer system results. The stabilizing effect with respect to thermal stability in poly-α-olefins of the stabilizer combinations of the invention is substantially greater than the additive effect of the individual components of such stabilizer combinations.

To the poly-α-olefin compositions of the invention can also be added minor proportion amounts, usually about .001% to 5% by weight based on the poly-α-olefin, of zinc stearate, calcium stearate, sodium stearate or an organic phosphite such as those described in the Joyner and Coover copending application, Serial No. 681,897, filed September 4, 1957, now abandoned.

The invention is illustrated by the following examples of preferred embodiments thereof. In the following examples, the stability of the poly-α-olefins was determined by an oven storage test. The poly-α-olefin under investigation is compression molded into a smooth sheet or plate. The plate is then cut into pieces weighing about 0.25 g. each. The 0.25 g. samples of the molded polymer are then placed in an air oven at 160° C. Samples are removed at intervals and each sample analyzed for peroxides. The oven storage life is the time required for initial peroxide formation in a sample of the polymer. To determine peroxide formation in the oven exposed samples, each 0.25 g. sample in question is dissolved or suspended in 20 ml. of carbon tetrachloride and allowed to digest for 25 minutes. To this is added 20 ml. of a mixture consisting of 50% glacial acetic acid and 40% chloroform, and then 1.0 ml. of a saturated aqueous solution of potassium iodide. The resulting mixture is allowed to react for two minutes, 100 ml. of water is added to dilute the mixture, and then a starch indicator is added. The resulting mixture is then back-titrated with 0.002 N sodium thiosulfate. The peroxide concentration, P, in milliequivalents per kilogram of polymer is given by the expression, $P = 8S$, where S is the number of milliliters of 0.002 N sodium thiosulfate used.

EXAMPLE 1

Samples of powdered polypropylene were mixed with several stabilizer combinations of the invention as well as with sub-combinations and individual stabilizers comprising such stabilizer combinations of the invention, compression molded into plates 1/16 inch in thickness, and the resulting molded samples evaluated with respect to thermal stability by the 160° C. oven storage test described above. The polypropylene was a plastic grade solid polypropylene having an average molecular weight greater than 15,000, a density of about .91 and an inherent viscosity of about 1.84 as determined in tetralin at 145° C. The results of the stability evaluations are summarized by the data set out in Table A below. In Table A, "DLTDP" designates dilauryl-3,3'-thiodipropionate. The concentrations in Table A are based on the weight of polypropylene.

Table A

| Additive: | Oven life at 160° C., hours |
|---|---|
| (1) None | 0.2 |
| (2) 0.1% DLTDP | 1 |
| (3) 0.1% 4,4'-n-butylidenebis(3-methyl-6-tert.-butylphenol) | 5 |
| (4) 1.0% phenyl salicylate | <1 |
| (5) 1.0% p-tert.-butylphenyl, 5-tert.-butyl salicylate | <0.5 |
| (6) 1.0% p-tert.-octylphenyl salicylate | <1 |
| (7) 1.0% phenyl salicylate+0.1% DLTDP | <1 |
| (8) 1.0% p-tert.-octylphenyl salicylate+0.1% DLTDP | <1 |
| (9) 1.0% phenyl, 3-phenyl salicylate+0.1% DLTDP | <1 |
| (10) [0.1% 4,4'-n-butylidenebis(3-methyl-6-tert.-butylphenol)+0.1% DLTDP]=A | 100 |
| (11) A+1.0% phenyl salicylate | 240 |
| (12) A+1.0% p-tert.-octylphenyl salicylate | 240 |
| (13) A+1.0% phenyl, 3-phenyl salicylate | >250 |
| (14) A+1.0% p-tert.-butylphenyl, 5-tert.-butyl salicylate | 220 |

In the above table, the octyl radical of the p-tert.-octylphenyl salicylate was a 1,1,3,3-tetramethylbutyl radical. While phenyl salicylates are effective ultraviolet inhibitors in poly-α-olefins, such materials are ineffective heat stabilizers. Hence, it was unexpected when the addition of a phenyl salicylate to the combination of a dialkyl-3,3'-thiodipropionate and an alkylidenbisphenol was found to be an outstanding stabilizer combination in poly-α-olefins against thermal degradation. Such was particularly unexpected in view of the fact that the combinations of phenyl salicylates and dialkyl-3,3'-thiodipropionates are ineffective heat stabilizers. Similar synergism as that demonstrated in Table A is also demonstrated if plastic grade solid polyethylene having an average molecular weight greater than 15,000, a density of about .91 and a melt index of about 7.59 is substituted for the polypropylene as the poly-α-olefin, or distearyl-3,3'-thiodipropionate for the dilauryl-3,3'-thiodipropionate, or di-n-octyl-3,3'-thiodipropionate for the dilauryl-3,3'-thiodipropionate, or if the various combinations of dialkyl-3,3'-thiodipropionates and alkylidenebisphenols described in the copending application by Joyner, Shearer and Tholstrup, Serial No. 850,985, filed November 5, 1959, are substituted for the combinations of dilauryl-3,3'-thiodipropionate and 4,4'-n-butylidenebis(3-methyl-6-tert.-butylphenol), in the described stabilization evaluations.

EXAMPLE 2

Several samples of polypropylene as described in Example 1 containing various stabilizer combinations of the invention and including calcium stearate were evaluated with respect to thermal stability by the 160° C. oven storage test as described in Example 1. The results of the test are summarized by the data set out in Table B below. In Table B, "DLTDP" designates dilauryl-3,3'-thiodipropionate. The concentrations in Table B are based on the weight of the polypropylene.

Table B

| Additive: | Oven life at 160° C., hours |
|---|---|
| (1) None | 0.2 |
| (2) 0.1% DLTDP | 1 |
| (3) 0.1% 4,4'-n-butylidenebis(3-methyl-6-tert.-butylphenol) | 5 |
| (4) 0.05% calcium stearate | <1 |
| (5) 1.0% p-tert.-octylphenyl salicylate | <1 |
| (6) 1.0% phenyl, 3-phenyl salicylate | <1 |
| (7) 1.0% p-tert.-butylphenyl, 5-tert.-butylsalicylate | <1 |
| (8) 1.0% p-tert.-octylphenyl salicylate+0.1% DLTDP | <1 |
| (9) 1.0% phenyl, 3-phenyl salicylate+0.1% DLTDP | <1 |
| (10) [0.1% 4,4'-n-butylidenebis(3-methyl-6-tert.-butylphenol)+0.1% DLTDP+0.05% calcium stearate]=B | 140 |
| (11) B+1.0% p-tert.-octylphenyl salicylate | >250 |
| (12) B+1.0% phenyl, 3-phenyl salicylate | >250 |
| (13) B+1.0% p-tert.-butylphenyl, 5-tert.-butyl salicylate | >250 |
| (14) B+1.0% resorcinol monobenzoate | 80 |

In Table B, the octyl radical of the p-tert.-octylphenyl salicylate was a 1,1,3,3-tetramethylbutyl radical. The ineffectiveness of resorcinol monobenzoate (item 14, Table B) as compared to the closely related phenyl salicylate components of the invention further illustrate the unobviousness of the present invention.

EXAMPLE 3

A stabilizer combination of the invention in polypropylene was evaluated with respect to thermal stability by the method described in Example 1 except that the polypropylene had an inherent viscosity of 1.74 as determined in tetralin at 145° C. The results of the stability evaluation are summarized by the data set out in Table C below. In Table C, "DLTDP" designates dilauryl-3,3'-thiodipropionate. The concentrations in Table C are based on the weight of the polypropylene.

Table C

| Additive: | Oven life at 160° C., hours |
|---|---|
| (1) None | 0.2 |
| (2) 0.05% 4,4'-n-butylidenebis(3-methyl-6-tert.-butylphenol) | 5 |
| (3) 0.1% DLTDP | 1 |
| (4) 0.05% calcium stearate | <1 |
| (5) 1.0% p-tert.-octylphenyl, 5-tert.-butyl salicylate | 0.2 |
| (6) 0.1% DLTDP+1% p-tert.-octylphenyl, 5-tert.-butyl salicylate | <1 |
| (7) 0.1% DLTDP+0.05% calcium stearate | <2 |
| (8) [0.05% 4,4'-n-butylidenebis(3-methyl-6-tert.-butylphenol)+0.1% DLTDP+0.05% calcium stearate]=C | 110 |
| (9) C+1.0% p-tert.-octylphenyl, 5-tert.-butyl salicylate | 280 |

In Table C, the octyl radical of the p-tert.-octylphenyl, 5-tert.-butyl salicylate was a 1,1,3,3-tetramethylbutyl radical.

The present invention thus provides novel poly-α-olefin compositions having improved stability against deterioration resulting from exposure to elevated temperatures, and particularly, it provides novel synergistic stabilizer combinations for poly-α-olefin compositions.

Although the invention has been described in detail with reference to preferred embodiments thereof, it will be understood that variations and modifications can be effected within the spirit and scope of the invention as described hereinabove and as defined by the appended claims.

I claim:

1. A solid poly-α-olefin composition comprising a solid poly-α-olefin prepared from an α-monoolefinic aliphatic hydrocarbon having 2 to 10 carbon atoms containing a stabilizer combination comprising about .001% to 10% by weight based on said poly-α-olefin of a diester of 3,3'-thiodipropionic acid having the formula

wherein R is an alkyl radical having 4 to 20 carbon atoms; about .001% to 10% by weight based on said poly-α-olefin of an alkylidene-bisphenol, and about .001% to 10% by weight based on said poly-α-olefin of a phenyl salicylate, said alkylidenebisphenol having the formula

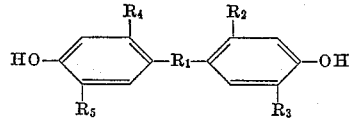

wherein $R_1$ is an alkylidene radical having 1 to 12 carbon atoms and $R_2$, $R_3$, $R_4$ and $R_5$ are alkyl radicals having 1 to 12 carbon atoms, and said phenyl salicylate having the formula

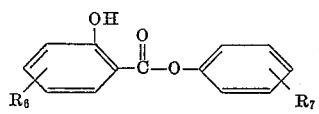

wherein $R_6$ and $R_7$ are selected from the group consisting of hydrogen atoms, alkyl radicals having 1 to 15 carbon atoms and cyclic hydrocarbon radicals having 6 to 12 carbon atoms.

2. A solid poly-α-olefin composition comprising a solid poly-α-olefin selected from the group consisting of polyethylene and polypropylene containing a stabilizer combination comprising: (a) about .001% to 10% by weight based on said poly-α-olefin of a stabilizer combination comprising a diester of 3,3'-thiodipropionic acid having the formula

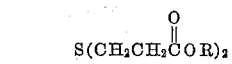

wherein R is an alkyl radical having 4 to 4 carbon atoms; (b) about .001% to 10% by weight based on said poly-α-olefin of an alkylidenebisphenol having the formula

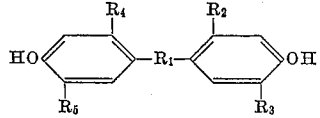

wherein $R_1$ is an alkylidene radical having 1 to 12 carbon atoms and $R_2$, $R_3$, $R_4$ and $R_5$ are alkyl radicals having 1 to 12 carbon atoms; and (c) about .001% to 10% by weight based on said poly-α-olefin of a phenyl salicylate having the formula

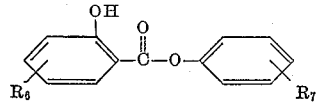

wherein $R_6$ and $R_7$ are selected from the group consisting of hydrogen atoms, alkyl radicals having 1 to 15 carbon atoms and cyclic hydrocarbon radicals having 6 to 12 carbon atoms.

3. A solid poly-α-olefin composition comprising solid polyethylene containing a stabilizer combination comprising: (a) about .001% to 5% by weight based on said polyethylene of a diester of 3,3'-thiodipropionic acid having the formula

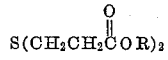

wherein R is an alkyl radical having 8 to 18 carbon atoms; (b) about .001% to 5% by weight based on said polyethylene of an alkylidenebisphenol having the formula

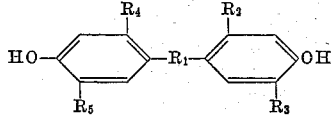

wherein $R_1$ is an alkylidene radical having 1 to 12 carbon atoms and $R_2$, $R_3$, $R_4$ and $R_5$ are alkyl radicals having 1 to 12 carbon atoms; and (c) about .001% to 5% by weight based on said polyethylene of a phenyl salicylate having the formula

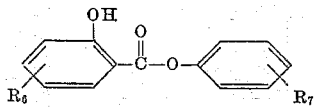

wherein $R_6$ and $R_7$ are selected from the group consisting of hydrogen atoms, alkyl radicals having 1 to 15 carbon atoms and cyclic hydrocarbon radicals having 6 to 12 carbon atoms.

4. A composition as described in claim 3 wherein the diester of 3,3'-thiodipropionic acid is dilauryl-3,3'-thiodipropionate.

5. A solid poly-α-olefin composition comprising solid polypropylene containing a stabilizer combination comprising: (a) about .001% to 5% by weight based on said polypropylene of a diester of 3,3'-thiodipropionic acid having the formula

wherein R is an alkyl radical having 8 to 18 carbon atoms; (b) about .001% to 5% by weight based on said polypropylene of an alkylidenebisphenol having the formula

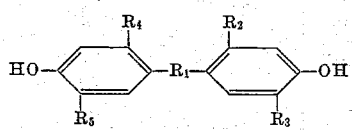

wherein $R_1$ is an alkylidene radical having 1 to 12 carbon atoms and $R_2$, $R_3$, $R_4$ and $R_5$ are alkyl radicals having 1 to 12 carbon atoms; and (c) about .001% to 5% by weight based on said polypropylene of a phenyl salicylate having the formula

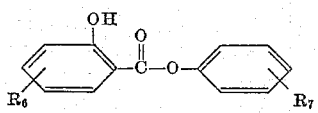

wherein $R_6$ and $R_7$ are selected from the group consisting of hydrogen atoms, alkyl radicals having 1 to 15 carbon atoms and cyclic hydrocarbon radicals having 6 to 12 carbon atoms.

6. A composition as described in claim 3 wherein the diester of 3,3'-thiodipropionic acid is dilauryl-3,3'-thiodipropionate.

7. A solid poly-α-olefin composition comprising solid polypropylene containing a stabilizer combination comprising about .01% to 3% by weight based on said polypropylene of dilauryl-3,3'-thiodipropionate, about .01% to 3% by weight based on said polypropylene of 4,4'-butylidenebis(3-methyl-6-tert.-butylphenol) and about .01% to 3% by weight based on said polypropylene of a phenyl salicylate selected from the group consisting of: phenyl salicylate; p-tert.-octylphenyl salicylate; p-tert.-octylphenyl, 5-tert.-butyl salicylate; phenyl, 3-phenyl salicylate and p-tert.-butylphenyl, 5-tert.-butyl salicylate.

8. A solid poly-α-olefin composition comprising solid polyethylene containing a stabilizer combination comprising about .01% to 3% by weight based on said polyethylene of dilauryl-3,3'-thiodipropionate, about .01% to 3% by weight based on said polyethylene of 4,4'-n-butylidenebis(3-methyl-6-tert.-butylphenol) and about .01% to 3% by weight based on said polyethylene of phenyl salicylate.

9. A solid poly-α-olefin composition comprising solid polyethylene containing a stabilizer combination comprising about .01% to 3% by weight based on said polyethylene of dilauryl-3,3'-thiodipropionate, about .01% to 3% by weight based on said polyethylene of 4,4'-n-butylidenebis(3-methyl-6-tert.-butylphenol) and about .01% to 3% by weight based on said polyethylene of p-tert.-octylphenyl salicylate.

10. A solid poly-α-olefin composition comprising solid polyethylene containing a stabilizer combination comprising about .01% to 3% by weight based on said polyethylene of dilauryl-3,3'-thiodipropionate, about .01% to 3% by weight based on said polyethylene of 4,4'-n-butylidenebis(3-methyl-6-tert.-butylphenol) and about .01% to 3% by weight based on said polyethylene of p-tert.-octylphenyl, 5-tert.-butyl salicylate.

11. A solid poly-α-olefin composition comprising solid polyethylene containing a stabilizer combination comprising about .01% to 3% by weight based on said polyethylene of dilauryl-3,3'-thiodipropionate, about .01% to 3% by weight based on said polyethylene of 4,4'-n-butylidenebis(3-methyl-6-tert.-butylphenol) and about .01% to 3% by weight based on said polyethylene of phenyl, 3-phenyl salicylate.

12. A solid poly-α-olefin composition comprising solid polyethylene containing a stabilizer combination comprising about .01% to 3% by weight based on said polyethylene of dilauryl-3,3'-thiodipropionate, about .01% to 3% by weight based on said polyethylene of 4,4'-n-butylidenebis(3-methyl-6-tert.-butylphenol) and about .01% to 3% by weight based on said polyethylene of p-tert.-butylphenyl, 5-tert.-butyl salicylate.

13. A solid poly-α-olefin composition comprising solid polypropylene containing a stabilizer combination comprising about .01% to 3% by weight based on said polypropylene of dilauryl-3,3'-thiodipropionate, about .01% to 3% by weight based on said polypropylene of 4,4'-n-butylidenebis(3-methyl-6-tert.-butylphenol) and about .01% to 3% by weight based on said polypropylene of phenyl salicylate.

14. A solid poly-α-olefin composition comprising solid polypropylene containing a stabilizer combination comprising about .01% to 3% by weight based on said polypropylene of dilauryl-3,3'-thiodipropionate, about .01% to 3% by weight based on said polypropylene of 4,4'-n-butylidenebis(3-methyl-6-tert.-butylphenol) and about .01% to 3% by weight based on said polypropylene of p-tert.-octylphenyl salicylate.

15. A solid poly-α-olefin composition comprising solid polypropylene containing a stabilizer combination comprising about .01% to 3% by weight based on said polypropylene of dilauryl-3,3'-thiodipropionate, about .01% to 3% by weight based on said polypropylene of 4,4'-n-butylidenebis(3-methyl-6-tert.-butylphenol) and about .01% to 3% by weight based on said polypropylene of p-tert.-octylphenyl, 5-tert.-butyl salicylate.

16. A solid poly-α-olefin composition comprising solid polypropylene containing a stabilizer combination comprising about .01% to 3% by weight based on said polypropylene of dilauryl-3,3'-thiodipropionate, about .01% to 3% by weight based on said polypropylene of 4,4'-n-butylidenebis(3-methyl-6-tert.-butylphenol) and about .01% to 3% by weight based on said polypropylene of phenyl, 3-phenyl salicylate.

17. A solid poly-α-olefin composition comprising solid polypropylene containing a stabilizer combination comprising about .01% to 3% by weight based on said polypropylene of dilauryl-3,3'-thiodipropionate, about .01% to 3% by weight based on said polypropylene of 4,4'-n-butylidenebis(3-methyl-6-tert.-butylphenol) and about .01% to 3% by weight based on said polypropylene of p-tert.-butylphenyl, 5-tert.-butyl salicylate.

References Cited in the file of this patent

UNITED STATES PATENTS

| | | |
|---|---|---|
| 2,514,216 | Stefl | July 4, 1950 |
| 2,519,755 | Gribbins | Aug. 22, 1950 |
| 2,568,902 | Thompson et al. | Sept. 25, 1951 |
| 2,859,194 | Reid et al. | Nov. 4, 1958 |
| 2,917,550 | Dietzler | Dec. 15, 1959 |

UNITED STATES PATENT OFFICE

CERTIFICATE OF CORRECTION

Patent No. 3,033,814                                                   May 8, 1962

Clarence E. Tholstrup

It is hereby certified that error appears in the above numbered patent requiring correction and that the said Letters Patent should read as corrected below.

Column 6, line 32, for "4 to 4" read -- 4 to 20 --.

Signed and sealed this 9th day of October 1962.

(SEAL)
Attest:

ERNEST W. SWIDER                                        DAVID L. LADD
Attesting Officer                                            Commissioner of Patents